(12) United States Patent
Dilg et al.

(10) Patent No.: US 6,361,883 B1
(45) Date of Patent: Mar. 26, 2002

(54) COMPOSITE SHEET STEEL, IN PARTICULAR, FOR PROTECTING VEHICLES AGAINST SHOTS

(75) Inventors: Christoph Dilg, Dillingen; Uwe Hofmann, Beckingen; Claus Just; Hans-Jürgen Rögele, both of Dilligen; Helmut Schönberger, Saarlouis-Beaumarais; Jürgen Vogt, Dillingen-Diefflen, all of (DE)

(73) Assignee: Aktiengesellschaft der Dillinger Hüttenwerke, Dillingen (DE)

( * ) Notice: Subject to any disclaimer, the term of this patent is extended or adjusted under 35 U.S.C. 154(b) by 0 days.

(21) Appl. No.: 09/670,494

(22) Filed: Sep. 26, 2000

(30) Foreign Application Priority Data

Dec. 22, 1999 (DE) .......................................... 199 61 948

(51) Int. Cl.⁷ ............................. B32B 15/18; F41H 5/04

(52) U.S. Cl. ...................... 428/679; 89/36.01; 89/36.02; 109/85; 148/527; 148/529; 148/530; 428/682; 428/686; 428/911; 428/925; 428/926

(58) Field of Search ................................. 428/679, 682, 428/686, 911, 925, 926; 89/36.01, 36.02; 109/85; 148/527, 529, 530

(56) References Cited

FOREIGN PATENT DOCUMENTS

| EP | 1 008 659 A1 | * | 6/2000 | ............ C21D/6/00 |
| EP | 1 052 089 A2 | * | 11/2000 | ........... B32B/15/01 |

* cited by examiner

*Primary Examiner*—Robert R. Koehler
(74) *Attorney, Agent, or Firm*—Friedrich Kueffner

(57) ABSTRACT

A composite sheet steel of maraging steel has an outer layer and an inner layer, wherein the outer layer is harder than the inner layer and the inner layer is more tenacious than the outer layer. An intermediate layer is positioned between the inner layer and the outer layer, wherein the intermediate layer is thinner than the inner and the outer layers.

7 Claims, No Drawings

COMPOSITE SHEET STEEL, IN PARTICULAR, FOR PROTECTING VEHICLES AGAINST SHOTS

BACKGROUND OF THE INVENTION

1. Field of the Invention

The invention relates to a composite sheet steel of maraging steel, especially for the protection of vehicles, especially passenger vehicles and transport vehicles for valuables, against shots and the effect of explosives, wherein the composite sheet steel has a hardened outer layer and a tenacious inner layer.

2. Description of the Related Art

Such a composite sheet steel is known from DE 43 44 879 C2.

A variation and further development of such a sheet steel are disclosed in the German patent application 199 21 961.3. According to this patent application, the steel of the inner layer has a chemical composition in percent by weight of $C \leq 0.01$, $Si \leq 0.1$, $Mn \leq 0.1$, $P \leq 0.005$, $S \leq 0.005$, $Cu \leq 0.1$, Mo 4.80 to 5.20, Ni 17.5 to 18.5, $Cr \leq 0.1$, Ti 0.55 to 0.70, Co 8.0 to 9.0 as well as optionally Al 0.05 to 0.15, and the steel of the outer layer, has a chemical composition, after purification by a zone melting process, in percent by weight of $C \leq 0.01$, $Si < 0.1$, Mn 0.02 to 0.20, $P \leq 0.005$, $S \leq 0.005$, Cu 0.01 to 0.20, Mo 4.80 to 5.20, Ni 17.5 to 18.5, Cr 0.01 to 0.20, Ti 1.80 to 1.95, Co 14.0 to 15.5, Al 0.05 to 0.15, with the remainder being Fe and contaminants resulting from the process, respectively. The steel of the outer layer is thus substantially free of oxide inclusions which, according to the assumption of the invention, should be avoided as much as possible because of their notch effect causing cracks, in particular, during loading of the steel when subjected to shots, and this cannot be neglected in this context. A composite sheet steel produced accordingly fulfills especially high requirements.

In general, the brittle outer layer of the composite sheet steels of the aforementioned kind has a tendency to separate from the more tenacious inner layer at a spacing of approximately 5 to 10 cm from the impact location, and complete detachment may occur. Such a detachment can occur despite a proven fixed bonding between the two layers. According to the laws of probability, further impacts will generally occur at different locations, but, when a projectile impacts on the location with detached outer layer, only the inner layer is present and cannot prevent the projectile from penetrating.

SUMMARY OF THE INVENTION

It is an object of the present invention to increase the resistance of a composite steel against detachment or separation of the outer layer from the inner layer.

In accordance with the present invention, this is achieved in that an intermediate layer is arranged between the outer layer and the inner layer, wherein the intermediate layer is thinner than the inner and outer layers.

The intermediate layer is not provided for the purpose of serving as a bonding agent for a further strengthening of the bonding between the inner and the outer layers.

The invention is based on the assumption that the transversal vibrations of the sheet steel resulting from the impact of the projectile and the transversal and longitudinal waves spreading from the impact location within the sheet steel can spatially and temporally coincide such that especially high, detachment-causing tensile stress is generated at certain locations, wherein within the two-layer steel the longitudinal waves alone can also form tension peaks caused by the coincidence of continuing partial waves at the interface as a result of the splitting of the longitudinal waves at the interface into a penetrating portion and a reflected portion and the reflection on the two surfaces.

The latter effect is reduced by the invention in that within the thin intermediate layer a system of correspondingly frequently reflected partial waves is generated which prevents the possible coincidence of the waves in the two layers of the two-layer steel by the intermediately positioned disturbance area.

The intermediate layer is comprised, for example, of a nickel foil of the type used as a carbon diffusion barrier in composite sheet steels for container construction etc. Also, a high-tenacity micro-alloyed construction steel can be used.

The thickness of the intermediate layer may be very minimal. Depending on the material, it will be between $\frac{1}{100}$ and 1 mm.

The bonding of the three layers is performed preferably in one working step by roll-bonding after a corresponding preparation of the surfaces. Depending on the material and the thickness of the intermediate layer, other plating or cladding techniques can be used also.

As a preparation of the roll-bonding process, the two steel plates to be connected should be provided with metallic contact surfaces by means of metal removing machining such as planing or milling. Moreover, before roll-bonding, the plates should be welded together peripherally to be sealed and a high vacuum should be generated in the space between the two plates.

The measures according to the present invention can be combined in an advantageous manner with those of the aforementioned German patent application 199 21 961.3.

Also, these measures according to the present invention can be used in connection with measures disclosed in the German patent application 198 57 156.9 according to which, subsequent to the hardening, an additional surface (face) hardening is performed at a temperature which is identical to the conversion temperature of martensite into austenite.

DESCRIPTION OF THE PREFERRED EMBODIMENTS

In the following, the invention will be explained in more detail with the aid of several embodiments.

EXAMPLE 1

A composite sheet steel was produced as follows.

For the inner layer steel was melted in a vacuum induction furnaces which, after a zone melting process in a vacuum arc furnace, contained in percent by weight: 4.91 Mo, 17.75 Ni, 0.034 Cr, 0.60 Ti, 8.40 Co, 0.007 C, 0.038 Si, 0.032 Mn, 0.002 P, 0.005 S, 0.013 Cu, and 0.105 Al.

For the outer layer, also in a vacuum induction furnace, a steel was melted which, after a zone melting process in a vacuum arc furnace, contained in percent by weight: 4.93 Mo, 17.95 Ni, 0.037 Cr, 1.85 Ti, 14.19 Co, 0.006 C, 0.035 Si, 0.032 Mn, 0.003 P, 0.003 S, 0.018 Cu, and 0.095 Al.

The resulting blocks were first rolled to form slabs whose thickness corresponded to the thickness ratio of the layers in the sheet steel, i.e., the thickness of the inner layer to the thickness of the outer layer was 1:2.

The slabs were then milled and cleaned for forming metallic contact surfaces on one side, respectively, placed with the contact surfaces against one another, wherein a nickel foil of 0.02 mm thickness was interposed across half the surface area of the slabs, and the slabs were then peripherally welded together to be sealed. The unavoidable remaining space between the contact surfaces enclosed by the welding seam was evacuated. Then the parts were bonded to one another by roll-bonding. The composition of the nickel foil was 0.01% Mo, 0.01% Cr, 0.04% Ti, 0.06% Co, 0.007% C, 0.01% Si, 0.11% Mn, 0.005% P, 0.001% S, with the remainder being nickel. A sheet steel of 9.1 mm thickness was rolled out.

The sheet steel was then solution-annealed. Sample blanks were than cut and hardened by aging.

A high strength composite steel was produced with the following hardness.

|  | hardness [HRC] | | |
| --- | --- | --- | --- |
| outer layer | 59.9 | 60.9 | 60.5 |
| inner layer | 51.5 | 49.8 | 49.9 |

The resistance against shots was tested on samples of a size of 300×300 mm$^2$, which were cut partially from the three-layer and partially from the two-layer area of the sheet steel, by a shot testing facility according to EN 1522, shot class ("Beschußklasse") FB7, with full-jacketed hardcore ammunition of the caliber 7.62×51.

Result:

Overall, the three-layer sheet steel could stop all 18 projectiles of a total of 18 shots fired. The sheet steel did not show any damage except directly at the impact location.

The two-layer sheet steel stopped five projectiles of a total of six shots fired; one penetration resulted. The outer layer exhibited large areas of detachment.

In a sample consisting partially of two layers and partially of three layers, the outer layer of the two-layer area separated from the inner layer over the entire surface area up to the border region into the three-layer area upon impact of three shots fired, which shots were stopped by the sample. The adjoining three-layer area subsequently stopped six fired shots and showed no damage except at the impact locations.

The test was designed as a comparative example for demonstrating the improvement obtained with the intermediate layer provided according to the invention. In principle, the two-layer sheet steel could have been produced with better strength.

Example 2

Parts of the sheet steel of Example 1 were machined on the inner layer as well as the outer layer to an overall thickness of 8.5 mm wherein the thickness ratio of 1:2 of the two layers was maintained.

Samples of a size of 300×300 mm$^2$, partially cut from the three-layer and partially cut from the two-layer area of the sheet steel, were fired at as explained in connection with Example 1.

Result:

Overall the three-layer sheet steel stopped all six shots of a total of six shots fired. With the exception of the area directly at the impact location, the sheet steel did not show any damage.

The two-layer sheet stopped two shots of a total of five shots fired; 3 penetrations resulted.

The outer layer exhibited large areas of detachment.

While specific embodiments of the invention have been shown and described in detail to illustrate the inventive principles, it will be understood that the invention may be embodied otherwise without departing from such principles.

What is claimed is:

1. A composite sheet steel of maraging steel, the composite sheet steel comprising an outer layer and an inner layer, wherein the outer layer is harder than the inner layer and the inner layer is more tenacious than the outer layer, further comprising an intermediate layer positioned between the inner layer and the outer layer, wherein the intermediate layer is thinner than the inner and the outer layers.

2. The composite sheet steel according to claim 1, wherein the intermediate layer has a thickness of ¹⁄₁₀₀ mm to 1 mm.

3. The composite sheet steel according to claim 1, wherein the intermediate layer is comprised of nickel.

4. The composite sheet steel according to claim 1, wherein the intermediate layer is comprised of a micro-alloyed construction steel of high tenacity.

5. The composite sheet steel according to claim 1, wherein the inner layer, the intermediate layer, and the outer layer are bonded by roll-bonding.

6. The composite sheet steel according to claim 5, wherein the inner layer, the intermediate layer, and the outer layers are bonded by a single roll-bonding pass.

7. The composite sheet steel according to claim 1, configured to be mounted on vehicles as a protection against shots and the effect of explosives.

* * * * *